US012749487B2

(12) United States Patent
Yae

(10) Patent No.: US 12,749,487 B2
(45) Date of Patent: Sep. 29, 2026

(54) METHOD AND APPARATUS FOR PROVIDING VOICE RECOGNITION SERVICE

(71) Applicants: Hyundai Motor Company, Seoul (KR); Kia Corporation, Seoul (KR)

(72) Inventor: Seong Soo Yae, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 115 days.

(21) Appl. No.: 18/790,904

(22) Filed: Jul. 31, 2024

(65) Prior Publication Data

US 2025/0131922 A1 Apr. 24, 2025

(30) Foreign Application Priority Data

Oct. 19, 2023 (KR) ........................ 10-2023-0140353

(51) Int. Cl.

| | |
|---|---|
| ***G10L 15/22*** | (2006.01) |
| ***G10L 15/18*** | (2013.01) |
| ***G10L 15/20*** | (2006.01) |
| ***G10L 15/26*** | (2006.01) |

(52) U.S. Cl.

CPC .......... *G10L 15/22* (2013.01); *G10L 15/1815* (2013.01); *G10L 15/20* (2013.01); *G10L 15/26* (2013.01)

(58) Field of Classification Search

CPC ..... G10L 15/22; G10L 15/1815; G10L 15/20; G10L 15/26; G10L 15/1822; G10L 2015/223; G10L 2015/228; G10L 15/183; G10L 21/0208; G06F 16/61; G06F 16/63

See application file for complete search history.

(56) References Cited

U.S. PATENT DOCUMENTS

| | | | | |
|---|---|---|---|---|
| 6,064,646 | A * | 5/2000 | Shal | H03M 5/08 370/212 |
| 10,515,637 | B1 * | 12/2019 | Devries | G10L 15/1822 |
| 11,887,603 | B2 * | 1/2024 | Casado | G10L 15/22 |
| 2005/0015197 | A1 * | 1/2005 | Ohtsuji | G08G 1/0969 340/995.19 |
| 2006/0287866 | A1 * | 12/2006 | Cross | G10L 15/197 704/275 |
| 2011/0054899 | A1 * | 3/2011 | Phillips | G10L 15/30 704/235 |
| 2012/0035924 | A1 * | 2/2012 | Jitkoff | G01C 21/3608 704/235 |
| 2017/0371861 | A1 * | 12/2017 | Barborak | G06F 40/211 |
| 2018/0047387 | A1 * | 2/2018 | Nir | G10L 15/02 |
| 2019/0095428 | A1 * | 3/2019 | Asano | G10L 15/187 |
| 2022/0157307 | A1 * | 5/2022 | Hartung | G06F 3/167 |
| 2024/0021199 | A1 * | 1/2024 | Ishimaru | G10L 15/22 |
| 2024/0180482 | A1 * | 6/2024 | Stegmann | G06F 40/30 |

* cited by examiner

*Primary Examiner* — Michael Colucci

(74) *Attorney, Agent, or Firm* — Slater Matsil, LLP

(57) ABSTRACT

A method and apparatus for providing a voice recognition service can include separating a user utterance from noise and converting the user utterance into a text to generate content of the user utterance, extracting, from the content of the user utterance, call words information, domain information, end service name information, and operations information, generating a corrected user command by correcting a user command, and generating response information by using the corrected user command.

16 Claims, 4 Drawing Sheets

METHOD AND APPARATUS FOR PROVIDING VOICE RECOGNITION SERVICE

CROSS-REFERENCE TO RELATED APPLICATIONS

This application claims the benefit of Korean Patent Application No. 10-2023-0140353, filed on Oct. 19, 2023, which application is hereby incorporated herein by reference.

TECHNICAL FIELD

The present disclosure relates to a method and apparatus for providing a voice recognition service.

BACKGROUND

The statements in this section merely provide background information related to the present disclosure and do not necessarily constitute prior art.

Artificial intelligence (AI) is one of the subfields of computer science that attempts to artificially emulate the human ability of learning, reasoning, and perception. An artificial intelligence system is a computer system that embodies human-level intelligence, and unlike traditional rule-based smart systems, it is a machine that learns and makes decisions autonomously.

Recent advances in artificial intelligence techniques have led to a wide range of information technology applications. In particular, conversational systems, such as chatbots or virtual assistants, that can communicate with users by natural language are being utilized in various fields, and their technology is gradually developing. For a conversational system to communicate with a user, it needs to understand the user utterances, or input messages, from the conversational system's perspective. To achieve this Natural Language Understanding (NLU), the conversational system needs to derive the current context from the conversation between the conversational system and the user and the expected intent of the user from that context and analyze the input message based on the derived current context and/or intent.

Voice recognition services of this kind are increasingly being applied to various areas, such as home or automobile applications. For example, voice recognition services and telematics services are linked so that voice commands generated by the user utterance are delivered to the automobile to control thereof. This allows the user to lock/unlock the doors of the car, turn on the air conditioner in advance to regulate the temperature inside the car, get weather information, listen to music, or call someone.

If the user utterance does not have a voice assistant or end service name to call, the apparatus providing the voice recognition service may provide an undesired voice recognition service to the user's displeasure. Therefore, there is a need for a solution to the voice recognition service selection issue when there is no voice assistant or end service name to call with the user utterance.

SUMMARY

The present disclosure in some embodiments relates to a method and apparatus for providing a voice recognition service. More specifically, the present disclosure relates to methods, devices, and systems for providing voice recognition services by monitoring voice assistants used by a user and end services associated with those voice assistants and analyzing the user's speech or utterance.

According to an embodiment of the present disclosure, an apparatus for providing a voice recognition service can include a voice input unit configured to separate a user utterance from noise and to convert the user utterance into a text to generate content of the user utterance, a voice recognition unit configured to extract and classify, from the content of the user utterance, call words information, domain information, end service name information, and operations information, a classified information storage unit configured to store and manage the call words information, the domain information, the end service name information, and the operations information, a command correction unit configured to correct a user command to generate a corrected user command, in response to the content of the user utterance not including at least one or more of the call words information, the domain information, the end service name information, and the operations information, a speech conversion unit configured to convert the corrected user command into a voice command, a response generation unit configured to generate a response information by using the corrected user command, and a history storage unit configured to store a user's usage history of the voice recognition service.

According to an embodiment of the present disclosure, a method of providing a voice recognition service may include separating a user utterance from noise and converting the user utterance into a text to generate content of the user utterance, extracting, from the content of the user utterance, call words information, domain information, end service name information, and operations information, generating a corrected user command by correcting a user command, in response to the content of the user utterance not including at least one or more of the call words information, the domain information, the end service name information, and the operations information, and generating response information by using the corrected user command.

According to an embodiment of the present disclosure, a computer-readable medium storing a computer program can include computer-executable instructions for causing, when executed by a computer, the computer to perform steps of separating a user utterance from noise and converting the user utterance into a text to generate content of the user utterance, extracting, from the content of the user utterance, call words information, domain information, end service name information, and operations information, generating a corrected user command by correcting a user command, when the content of the user utterance does not include at least one or more of the call words information, the domain information, the end service name information, and the operations information, and generating response information by using the corrected user command.

DETAILED DESCRIPTION OF ILLUSTRATIVE EMBODIMENTS

Figure 1:
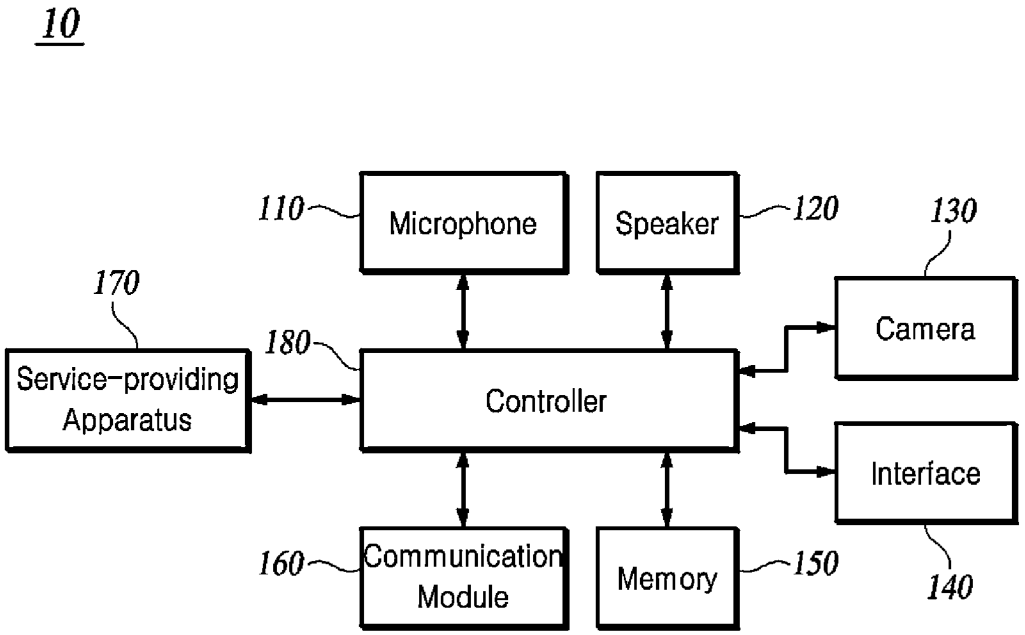
FIG. 1 is a block diagram illustrating a response device, according to an embodiment of the present disclosure.

Some embodiments of the present disclosure can provide a voice recognition service desired by a user when the user utterance gets no a voice assistant to be called or end service name.

In addition, an embodiment of the present disclosure can be aimed at correcting the user commands when the user utterance gets no voice assistant or end service name to be called.

In addition, an embodiment of the present disclosure can aim to utilize a user's usage history of a voice recognition service to determine a best voice recognition service to provide to the user.

The advantages achieved by some embodiments of the present disclosure are not limited to the advantages mentioned above, and other advantages not mentioned can be clearly understood by those skilled in the art from the description below.

Hereinafter, some example embodiments of the present disclosure will be described in detail with reference to the accompanying drawings. In the following description, like reference numerals can designate like elements, although the elements are shown in different drawings. Further, in the following description of some embodiments, a detailed description of known functions and configurations incorporated therein can be omitted for the purpose of clarity and for brevity.

Additionally, various terms such as "first", "second", "A", "B", "(a)", "(b)", etc., can be used merely to differentiate one component from another but not to necessarily imply or suggest the substances, order, or sequence of the components. Throughout this specification, when a part 'includes' or 'comprises' a component, the part is meant to possibly further include other components, not to exclude thereof unless specifically stated to the contrary. The terms such as 'unit', 'module', and the like can refer to one or more units for processing at least one function or operation, which may be implemented by hardware, software, or a combination thereof.

The following detailed description, together with the accompanying drawings, is intended to describe example embodiments of the present disclosure, and is not intended to represent the only embodiments in which the present disclosure may be practiced.

FIG. 1 is a block diagram illustrating a response device, according to at least one embodiment of the present disclosure.

Referring to FIG. 1, the response device 10 can include a memory 150 (storage medium) for storing information used to provide a service desired by a user, and a controller 180 (e.g., one or more processors) for controlling other components of the vehicle.

When implemented in a vehicle, the response device 10 can include all or part of the following: a microphone 110 for receiving the user's voice, a speaker 120 for outputting sound necessary to provide the service desired by the user, a camera 130 for capturing images of the interior or exterior of the vehicle, an interface 140 for input or output necessary to provide the service desired by the user, a communication module 160 for communicating with external devices, and a service-providing apparatus 170, any combination of or all of which may be in plural or may include plural components thereof.

The microphone 110 may be installed inside the response device 10 that is capable of receiving a user's voice. The user inputting voice into the microphone 110 may be a driver. The microphone 110 may be present at a location such as a steering wheel, center fascia, headliner, or room mirror to receive the driver's voice.

More than one microphone 110 may be present to receive input from a rear-seat passenger. A microphone 110 for receiving input from a rear-seat passenger may be present on an armrest of a front seat, an armrest of a rear seat, a rear door, or a B-pillar or C-pillar of a vehicle.

In addition to the user's voice, various audio occurring in the vicinity of the microphone 110 may be inputted to the microphone 110. The microphone 110 can output an audio signal corresponding to the input audio. The outputted audio signal may be processed by the controller 180, or transferred to an external server via the communication module 160.

In addition to the microphone 110, the response device 10 can include the interface 140 for receiving commands from the user manually, such as through touch commands. The interface 140 may include an input device in the form of an audio-video navigation (AVN) device on the center fascia, a button, or a jog shuttle on the gearbox or steering wheel.

Additionally, for receiving control commands from passenger seats, the interface 140 may include input devices provided on the doors to respective seats and may include input devices mounted on the armrests of the front seats or the armrests of the rear seats. The interface 140 may include a touchpad that implements a touchscreen as an integrated combination of an input device and a display.

The camera 130 can capture at least one of an interior image of the response device 10 or an exterior image of the response device 10. Thus, the camera 130 may be present inside the response device 10, may be present outside the response device 10, or may be present both inside and outside the response device 10.

The interface 140 may include the AVN display or a cluster display present on the center fascia of the response device 10 or a head-up display (HUD). The interface 140 may include a rear seat display that resides behind the head of a front seat passenger for viewing by a rear seat passenger, or when used for a multi-passenger vehicle such as a van, the response device 10 may include a headliner mounted display. The displays can be installed in a location that is viewable by a user occupying the vehicle, and no other restrictions are placed on the number or location of the displays.

The memory 150 can store a program that causes the controller 180 to perform methods according to at least one embodiment of the present disclosure. For example, the program may include a plurality of commands or instructions executable by the controller 180, and the commands may be executed by the controller 180 to perform the method according to at least one embodiment of the disclosure.

The communication module 160 can communicate with other devices by using at least one of various wireless communication methods such as Bluetooth, 4th generation (4G) communication, 5th generation (5G) communication, or Wi-Fi. The communication module 160 can communicate with other devices by using cables that connect to a universal serial bus (USB) port, an auxiliary (AUX) port, or the like. The communication module 160 can have two or more communication interfaces supporting different communication methods to send and receive information or signals to and from two or more other devices.

For example, the communication module 160 may communicate with a mobile device located inside the response device 10 by using a communication method such as Bluetooth communication to receive information obtained by the mobile device or stored on the mobile device. The information stored on the mobile device may be information on the user's video, the user's voice, contacts, schedules, and the like. The communication module 160 may communicate with the server by using a communication method such as 4G, 5G, etc. to transmit the user's voice and receive signals necessary to provide the service desired by the user. The communication module 160 may use the mobile device connected to the response device 10 to send and receive signals needed to and from the server.

The service-providing apparatus 170 may provide convenience features to users of the response device 10. For example, the service-providing apparatus 170 may provide the user with music, information, or sports entertainment. The service-providing apparatus 170 may provide services for vehicle control, telephony services, or the like.

The controller 180 can turn the microphone 110 on and off, and can process or store the voice inputted to the microphone 110 or forward it to other devices by using the communication module 160. The controller 180 can control the display to show an image and controls the speaker 120 to output sound.

The controller 180 can perform various controls related to the response device 10. For example, the controller 180 may control the service-providing apparatus 170 based on user commands inputted via the microphone 110 or the interface 140. The controller 180 can perform at least some of the functions of a voice recognition service provider to analyze the driver's or passenger's utterance. The voice recognition service provider is described in more detail in FIG. 2. The controller 180 may include at least one memory for storing a program for performing the aforementioned operations and operations described below, and at least one processor executing the stored program.

Figure 2:
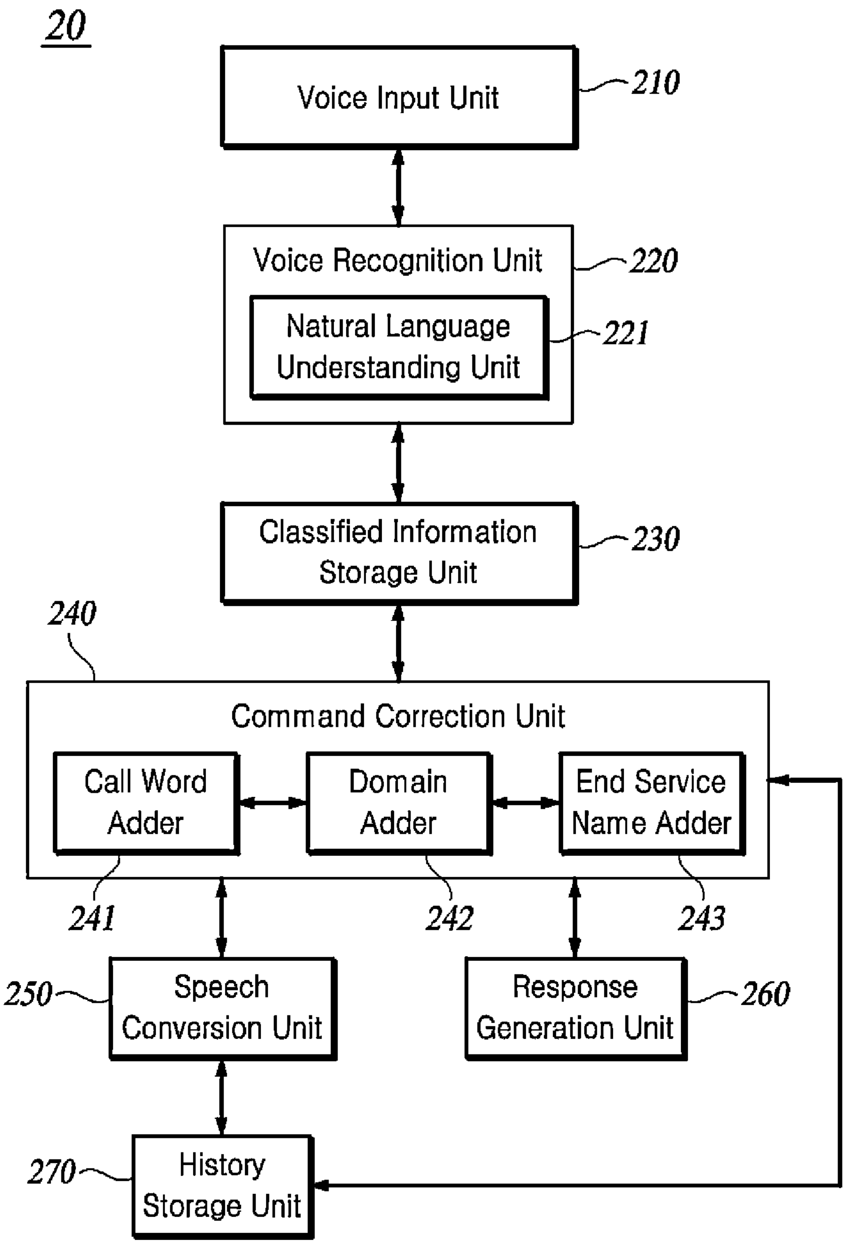
FIG. 2 is a block diagram illustrating an apparatus for providing a voice recognition service, according to an embodiment of the present disclosure.

FIG. 2 is a block diagram illustrating an apparatus for providing a voice recognition service, according to at least one embodiment of the present disclosure.

Referring to FIG. 2, the apparatus for providing a voice recognition service (hereinafter referred to as "voice recognition service provider 20") can include all or part of a voice input unit 210, a voice recognition unit 220, a classified information storage unit 230, a command correction unit 240, a speech conversion unit 250, a response generation unit 260, and a history storage unit 270, any combination of or all of which may be in plural or may include plural components thereof. The voice recognition service provider 20 and each component thereof may be implemented in hardware or software, or a combination of hardware and software. Additionally, the functionality of each component may be implemented in software, and one or more processors may be implemented to execute the functionality of the software corresponding to each component.

The voice input unit 210 may separate a user's utterance from noise. The voice input unit 210 may convert the user utterance to text based on learning using machine learning or deep learning to generate a transcript of the user utterance in text format. The voice input unit 210 can convert the user utterance into text by performing Speech To Text (STT) to generate content of the user utterance. The voice input unit 210 can transmit the content of the user utterance to the voice recognition unit 220. The voice recognition unit 220 can extract and process information on call words, domains, end service names, and operations from the content of the user utterance. In other words, the user commands can be categorized into information on call words, domains, end service names, and operations. The voice recognition unit 220 can include a natural language understanding unit 221.

The natural language understanding unit 221 can utilize at least one Natural Language Understanding (NLU) engine to classify intention of the user utterance contained in an inputted sentence and extract slots representing significant information related to the utterance intent. The slot can be a semantic object that is required to provide a response based on the utterance intent. A slot may be predefined for each utterance intent. The role of the slot can be determined based on the utterance intent.

The NLU engine may determine the intention of the user utterance and slot for an inputted sentence by comparing the inputted sentence with a preset grammar. For example, if the preset grammar is "Call <someone>" and the inputted sentence is "Call Hong Gildong", the NLU engine may determine that the utterance intent is "to make a call" and the slot value is "Hong Gildong."

The NLU engine may use tokenization, a deep learning model, or the like to determine the utterance intent and slot for the user's inputted sentence. Specifically, the NLU engine may segment the inputted sentence into morphemic tokens. A morpheme represents the smallest unit of meaning beyond which no further analysis is available. Additionally, the NLU engine can tag each token with a part of speech.

The NLU engine can project the tokens into a vector space. The respective tokens or combination of tokens can be transformed into an embedding vector. To improve performance, sequence embedding, position embedding, etc. may be additionally performed. By grouping the embedding vectors or applying the first deep learning model and the second deep learning model to the embedding vectors, the NLU engine can determine the utterance intent and slot for the inputted sentence. The first deep learning model may be a recurrent neural network pre-trained to classify the utterance intent in response to the input of the embedding vectors. The second deep learning model may be a recurrent neural network pre-trained to determine the slot in response to the input of the embedding vectors.

The natural language understanding unit 221 may utilize the NLU engine to extract information such as call words, domain, end service name, or operations from the inputted sentence. The domain can be information for identifying the topic of the user's utterance. For example, domains representing various topics such as vehicle control, information provision, texting, phone functions, music playback, or navigation functions may be determined based on the inputted sentence.

The end service name can be the name of the service provided in conjunction with the voice assistant. For example, in the context of a music delivery service, the information on the end service name may be "Melon (an online digital music streaming service)," "Apple Music," "Google Music," or "Amazon Music." The information on operations can be information that accompanies the provision of the service. For example, in the context of a music delivery service, the information on operations may be "play me one," "play it," or "play it back."

The information, such as a call word, domain, end service name, or action, may be utilized in at least one of the following operations: classifying the intent of the user utterance, determining a slot, or generating a response to the user utterance.

The classified information storage unit 230 can store and manage information on the classified call words, domains, end service names, and operations from the voice recognition unit 220.

The command correction unit 240 can be responsive to the content of the user utterance lacking at least one of the information on the call words, domain, end service name, and operations for determining the lacking information. For example, when no information on the call words is present in the content of the user utterance, the command correction unit 240 may determine a lack of information on the call words. When no information on the end service name is present in the content of the user utterance, the command correction unit 240 may determine the lacking information on the end service name. The command correction unit 240 can include a call word adder 241, a domain adder 242, and an end service name adder 243, any combination of or all of which may be in plural or may include plural components thereof.

When no call word information is present in the content of the user utterance, the call word adder 241 may correct the user command by adding information on the call word to the user command. When no domain information is present in the content of the user utterance, the domain adder 242 may correct the user command by adding domain information to the user command. When no information on the end service name is present in the content of the user utterance, the end service name adder 243 may correct the user command by adding information on the end service name to the user command.

The command correction unit 240 can determine the information that is not present in the content of the user utterance, by using the user's usage history with the voice service in the history storage unit 270. If the content of the user utterance contains only information on the call words and no information on the end service name, the command correction unit 240 can determine the information on the end service name based on the most used end services. For example, if the content of the user utterance is "Hey KIA! (command to activate KIA Corporation's AI assistant) Play me the latest Song", the content of the user utterance contains information on the call word "Hey KIA!", but no information on the end service name. In this case, if 'Melon' and 'Genie' exist in the end services associated with 'Hey KIA!' and 'Melon' has been used one time and 'Genie' has been used zero times, the end service name adder 243 may correct the user command from "Hey KIA! Play me the latest Song" to "Hey KIA! Play me the latest Song from Melon."

When the content of the user utterance contains information on the end service name but no information on the call words, the command correction unit 240 can determine the information on the call words based on the most used voice assistant. For example, if the content of the user utterance is "Play me the latest Song from Melon," the content of the user utterance contains information on the end service name "Melon," but no information on the call words. In this case, if the voice assistants that support "Melon" are "Hey KIA!" and "Kakao (for an internet mobile service by Kakao Corp.)," and the number of times "Hey KIA!" has been used is greater than the number of times "Kakao" has been used, the call word adder 241 may correct the user command from "Play me the latest Song from Melon" to "Hey KIA! Play me the latest Song from Melon."

When the content of the user utterance contains neither information on the end service name nor information on the call words, the command correction unit 240 can determine the information on the end service name and the call words based on the frequency of use of the voice assistant and the associated service. For example, the content of the user utterance as "Play me the latest Song" has neither the information on the end service name nor the information on the call words. In this case, if "Melon" associated with "Hey KIA!" has been used one time and "Amazon Music" associated with "Amazon" has been used zero times, the call word adder 241 and the end service name adder 243 may correct the user command from "Play me the latest Song" to "Hey KIA! Play me the latest Song from Melon."

For example, the content of the user utterance as "Play me the latest Song" has neither information on the end service name nor information on the call words. In this case, if "Melon" associated with "Hey KIA!" has been used one time and "Amazon Music" associated with "Amazon" has been used one time, the command correction unit 240 may determine the information on the end service name and the information on the call words based on the number of times the voice assistant is used. For example, if "Hey KIA!" has been used one time and "Amazon" has been used two times, the call word adder 241 and the end service name adder 243 may correct the user command from "Play me the latest Song" to "Hey KIA! Play me the latest Song from Amazon Music."

For example, the content of the user utterance as "Play me the latest Song" has neither information on the end service name nor information on the call words. In this case, if "Melon" associated with "Hey KIA!" has been used one time, "Amazon Music" associated with "Amazon" one time, "Hey KIA!" one time, and "Amazon" one time, the command correction unit 240 may determine the information on the end service name and the information on the call words based on the recently used voice assistant. In other words, if "Hey KIA!" has been used more recently than "Amazon," the call word adder 241 and the end service name adder 243 may correct the user command from "Play me the latest Song" to "Hey KIA! Play me the latest Song from Melon."

When the content of the user utterance includes information on a domain that is not supported by a particular voice assistant, the command correction unit 240 can determine the information on the end service name and the information on the call words based on the voice assistant that supports the end service for that domain. For example, in the content of the user utterance as "Hey KIA! Turn on Air Conditioner in My House," "Hey KIA!" does not support the service of turning on/off the air conditioner. In this case, where 'Home IoT', an end service associated with 'Amazon', supports the service of turning on/off the air conditioner, the call word adder 241 and the end service name adder 243 may correct the user command from "Hey KIA! Turn on Air Conditioner in My House" to "Amazon Turn on Air Conditioner in My House with Home IoT."

When the content of the user utterance includes information on a domain that has no history of past usage, the command correction unit 240 can determine information on the end service name and information on the call words based on the very first activated voice assistant. For example, when the content of the user utterance is "Tell Me Today's weather" and there is no history of usage of the request for today's weather, the command correction unit 240 may support the service for the request for today's weather and determine the information on the end service name and the information on the call words based on the very first activated voice assistant. In other words, here, if "Kakao" was activated first and "Kakao" supports "Weather Channel" or "Apple Weather" that is a service for requesting today's weather, the call word adder 241 and the end service name adder 243 may correct the user command from "Tell Me Today's weather" to "Tell Me Today's weather on Kakao Weather Channel."

The speech conversion unit 250 can receive the corrected user command from the command correction unit 240. The speech conversion unit 250 can generate spoken commands by using the corrected user command. The speech conversion unit 250 can convert the corrected user command into voice commands by executing a text-to-speech (TTS) program. The TTS program can convert text to speech.

The response generation unit 260 can perform a process for providing a response to the corrected user command. The response generation unit 260 can provide response information to the user utterance by using a visual, auditory, or tactile interface or the like. The response information may be a control signal to be transmitted to the controller 180 of the response device 10.

The response generation unit 260 can use a generative model to generate response information that is easy for the vehicle occupant to recognize. For example, when the corrected user command is "Hey KIA! Play me the latest Song from Melon," the response generation unit 260 may send the controller 180 of the response device 10 response information to provide the music service. For example, when the corrected user command is "Tell Me Today's Weather on Kakao Weather Channel," the response generation unit 260 may request delivery of the content of interest to an external server that provides today's weather.

The history storage unit 270 can store usage history of which voice assistant the user called up and used, and which end service was provided. If the user manually selects a service by using the interface in addition to being offered the service by speaking, the history storage unit 270 can store the usage history for that service. The history storage unit 270 can store the usage history for the service when a set or predetermined amount of time has passed since the user was provided with the service, for example. The set or predetermined time may be arbitrary. For example, the set or predetermined time may be 5 seconds. This can be to avoid storing usage history for a service that is incorrectly selected by the user.

If the user command has information on the call words and information on the end service name, the history storage unit 270 can add one usage count for the corresponding voice assistant and one usage count for the end service. For example, if the user command is "Hey KIA! Play me the Latest Song from Melon," the history storage unit 270 may add one usage of "Hey KIA!" and one usage of "Melon."

If the user command contains information on call words and no information on an end service name, the history storage unit 270 can add a single usage count for that voice assistant. For example, if the user command is "Hey KIA! Play me the latest Song," the history storage unit 270 may only add one usage of "Hey KIA!."

The history storage unit 270 can utilize a source database and a virtual database copy to store usage history. The source database can be a database in which all existing usage histories are stored. When the vehicle is started, the history storage unit 270 can utilize a virtual database copy to store the usage history. The virtual database copy can be a database that is a copy of the source database. When the vehicle is turned off, the history storage unit 270 can use the virtual database copy to update the source database. If a certain service is deactivated while storing the usage history by using the virtual database copy, the history storage unit 270 can store whether the service is deactivated in the source database. Subsequently, if the service is activated, the history storage unit 270 can store the activation status of the service in the source database. In addition to the usage history, the history storage unit 270 also can store the usage time of the service.

Figure 3:
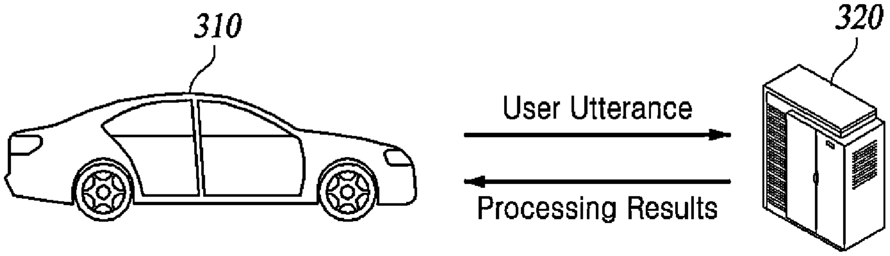
FIG. 3 is a diagram illustrating a relationship between a vehicle and a voice recognition system, according to an embodiment of the present disclosure.

FIG. 3 is a diagram illustrating a relationship between a vehicle and a voice recognition system, according to at least one embodiment of the present disclosure.

Referring to FIG. 3, the response device 10 and the voice recognition service provider 20 may be implemented on at least one of the vehicle 310 or the server 320.

For example, both the response device 10 and the voice recognition service provider 20 may be implemented in the vehicle 310. The controller 180 of the response device 10 can directly perform the functions of the voice recognition service provider 20. The response device 10 can provide voice recognition services to a user.

For example, the response device 10 may be implemented in the vehicle 310 and the voice recognition service provider 20 may be implemented in the server 320. The response device 10 in the vehicle 310 can transmit an utterance or voice command from a driver or passenger to the voice recognition service provider 20 in the server 320. The voice recognition service provider 20 can process the utterance or voice command to generate information or control commands required by the vehicle occupant and transmit the information or control commands to the response device 10 in the vehicle 310. The response device 10 can transmit the user utterance to the voice recognition service provider 20, receive the control command determined by the voice recognition service provider 20, and control the vehicle by using the control command.

For example, the response device 10 can transmit an utterance to the voice recognition service provider 20, receive an intent and a slot determined by the voice recognition service provider 20, generate a control signal corresponding to the intent and the slot, and control the vehicle by using the control signal. The functions of the response generation unit 260 in the voice recognition service provider 20 can be performed by the response device 10.

For example, both the response device 10 and the voice recognition service provider 20 may be implemented on the server 320. The response device 10 can receive an initial utterance from the vehicle, generate a voice command of the vehicle based on the initial utterance, and transmit the voice command of the vehicle to the voice recognition service provider 20. Then, the response device 10 can receive the voice command of the vehicle and perform a response action corresponding to the voice command. The response action can be transmitting a control signal or information corresponding to the voice command to the vehicle.

Figure 4:
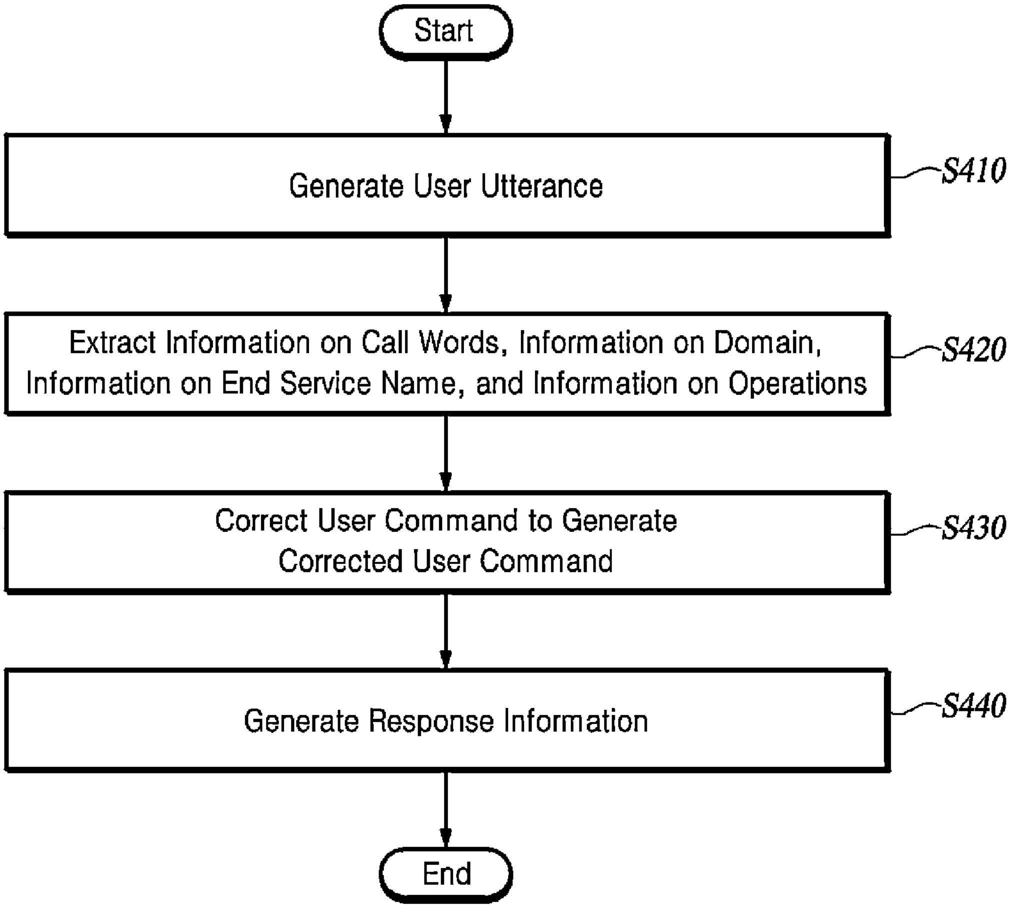
FIG. 4 is a flowchart of a method of providing a voice recognition service, according to an embodiment of the present disclosure.

FIG. 4 is a flowchart of a method of providing a voice recognition service, according to at least one embodiment of the present disclosure.

Referring to FIG. 4, the voice input unit 210 can generate content of user utterance, by separating the user utterance from noise and converting the user utterance to text (operation S410). The voice recognition unit 220 can extract, from the content of the user utterance, information on call words, information on a domain, information on an end service name, and information on the operations (operation S420). The information on the call words, the information on the domain, the information on the end service name, and the information on the operations can be extracted by classifying the user utterance intent, by using an NLU engine.

If the content of the user utterance does not include at least one of the information on the call words, the information on the domain, the information on the end service name, and the information on the operation, then the command correction unit 240 can correct the user command to generate a corrected user command (operation S430). If the content of the user utterance includes information on the call words and no information on the end service name, the command correction unit 240 can determine the information on the end service name by using the usage history of the end service and generate the corrected user command. If the content of the user utterance does not include information on the call words but does include information on the end service name, the command correction unit 240 can use the voice assistant's usage history to determine information on the call words to generate the corrected user command.

If the content of the user utterance includes neither information on the call words nor the end service name, the command correction unit 240 can determine the information on the call words and the end service name by using the usage history of the voice assistant, the usage history of the end service, and the usage history of the recently utilized service to generate the corrected user command. If the content of the user utterance includes information on a domain that is not supported by the invoked voice assistant, the command correction unit 240 can determine the information on the call words and the information on the end service name based on the information on the domain and generate the corrected user command. If the content of the user utterance includes information on a domain that has no usage history, the command correction unit 240 can determine the information on the call words and the information on the end service name by using the very first activated voice assistant to generate the corrected user command. The response generation unit 260 can generate response information by using the corrected user command (operation S440).

According to an embodiment of the present disclosure, even if a user utters an inaccurate command, the user can be offered the desired voice recognition service.

In addition, according to an embodiment of the present disclosure, the user can be provided with an optimal voice recognition service even if the user does not know the types of voice assistants and the end service associated with each voice assistant.

The advantages to be obtained by an embodiment of the present disclosure are not necessarily limited to the advantages mentioned above, and other advantages not mentioned can be clearly understood by those skilled in the art from the description below.

Each element of the apparatus or method in accordance with an embodiment of the present disclosure may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system can include at least one programmable processor, which may be a special purpose processor or a general purpose processor, coupled to receive and transmit data and instructions from and to a storage system, at least one input device, and at least one output device. Computer programs (also known as programs, software, software applications, or code) can include instructions for a programmable processor and can be stored in a storage medium or "computer-readable recording medium."

The computer-readable recording medium may include all types of storage devices on which computer-readable data can be stored. The computer-readable recording medium may be a non-volatile or non-transitory medium such as a read-only memory (ROM), a compact disc ROM (CD-ROM), magnetic tape, a floppy disk, a memory card, a hard disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an example description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although example embodiments of the present disclosure have been described for illustrative purposes, those skilled in the art can appreciate that various modifications, additions, and substitutions are possible, without departing from the idea and scope of the present disclosure and the claims. Therefore, example embodiments of the present disclosure have been described for the sake of brevity and clarity. The scope of the technical idea of the present embodiments is not limited by the illustrations. Accordingly, one of ordinary skill would understand that the scope of the present disclosure is not to be limited by the above explicitly described embodiments but by the claims and equivalents thereof.

What is claimed is:

1. An apparatus for providing a voice recognition service, comprising:

at least one processor; and a memory storing instructions that, when executed by the at least one processor, cause the apparatus to:

separate a user utterance, in which call word information for specifying one of a plurality of voice assistants is omitted, from noise;

convert the user utterance into text to generate content of the user utterance;

extract, from the content of the user utterance, extracted information including at least one of domain information, end service name information, and operations information;

generate a corrected user command including the call word information, the domain information, the end service name information, and the operations information, based on usage counts of combinations of each voice assistant of the plurality of voice assistants and the extracted information;

convert the corrected user command into a voice command by generating speech through a text-to-speech (TTS) process;

generate a control signal for a vehicle in response to the voice command; and control the vehicle based on the control signal.

2. The apparatus of claim 1, wherein execution of the instructions by the at least one processor further causes the apparatus to:

classify an intention of the user utterance, by using a natural language understanding engine.

3. The apparatus of claim 1, wherein execution of the instructions by the at least one processor further causes the apparatus to:

determine the call word information by using a voice assistant usage history of a voice assistant, in response to the content of the user utterance not including the call word information but including the end service name information.

4. The apparatus of claim 1, wherein execution of the instructions by the at least one processor further causes the apparatus to:

determine the call word information and the end service name information by using a voice assistant usage history of a voice assistant, an end service usage history of an end service, and a recently utilized service usage history of a recently utilized service, in response to the content of the user utterance not including the call word information and the end service name information.

5. The apparatus of claim 1, wherein execution of the instructions by the at least one processor further causes the apparatus to:

determine the call word information and the end service name information by using an end service based on the domain information, in response to the content of the user utterance including the domain information not being supported by an invoked voice assistant.

6. The apparatus of claim 1, wherein execution of the instructions by the at least one processor further causes the apparatus to:

determine the call word information and the end service name information by using a voice assistant activated earliest among the plurality of voice assistants, in response to the content of the user utterance including the domain information that has no usage history.

7. The apparatus of claim 1, wherein:

execution of the instructions by the at least one processor further causes the apparatus to store the usage counts by using a source database and a virtual database copy, the source database stores all existing usage histories, and the virtual database copy is a copy of the source database.

8. A method of voice recognition service, the method comprising:

separating a user utterance, in which call word information for specifying one of a plurality of voice assistants is omitted, from noise;

converting the user utterance into text to generate content of the user utterance;

extracting, from the content of the user utterance, extracted information including at least one of domain information, end service name information, and operations information;

generating a corrected user command including the call word information, the domain information, the end service name information, and the operations information, based on usage counts of combinations of each voice assistant of the plurality of voice assistants and the extracted information;

converting the corrected user command into a voice command by generating speech through a text-to-speech process;

generating a control signal for a vehicle in response to the voice command; and controlling the vehicle based on the control signal.

9. The method of claim 8, wherein extracting, from the content of the user utterance, the extracted information including at least one of the domain information, the end service name information, and the operations information comprises:

classifying an intention of the user utterance by using a natural language understanding engine to extract the domain information, the end service name information, and the operations information.

10. The method of claim 8, wherein generating the corrected user command comprises;

determining the call word information by using a voice assistant usage history of a voice assistant to generate the corrected user command, in response to the content of the user utterance not including the call word information but including the end service name information.

11. The method of claim 8, wherein generating the corrected user command comprises:

determining the call word information and the end service name information by using a voice assistant usage history of a voice assistant, an end service usage history of an end service, and a recently utilized service usage history of a recently utilized service to generate the corrected user command, in response to the content of the user utterance not including the call word information and the end service name information.

12. The method of claim 8, wherein generating the corrected user command comprises:

determining the call word information and the end service name information by using an end service based on the domain information to generate the corrected user command, in response to the content of the user utterance including the domain information not being supported by an invoked voice assistant.

13. The method of claim 8, wherein generating the corrected user command comprises:

determining the call word information and the end service name information by using a voice assistant activated earliest among the plurality of voice assistants to generate the corrected user command, in response to the content of the user utterance including the domain information having no usage history.

14. A non-transitory computer-readable medium storing a computer program including computer-executable instructions for causing, when executed by a computer, the computer to perform steps of:

separating a user utterance, in which call word information for specifying one of a plurality of voice assistants is omitted, from noise;

converting the user utterance into text to generate content of the user utterance;

extracting, from the content of the user utterance, extracted information including at least one of domain information, end service name information, and operations information;

generating a corrected user command including the call word information, the domain information, the end service name information, and the operations information, based on usage counts of combinations of each voice assistant plurality of voice assistants and the extracted information;

converting the corrected user command into a voice command by generating speech through a text-to-speech process;

generating a control signal for a vehicle in response to the voice command; and controlling the vehicle based on the control signal.

15. The apparatus of claim 1, wherein execution of the instructions by the at least one processor further causes the apparatus to:

operate a source database and a virtual database copy to manage the usage counts of combinations, wherein:

the virtual database copy is generated by copying the source database when the vehicle is started, and the source database is updated by using the virtual database copy when the vehicle is turned off.

16. The apparatus of claim 1, wherein execution of the instructions by the at least one processor further causes the apparatus to:

update the usage counts of combinations when a predetermined amount of time has passed after a service corresponding to the corrected user command is provided to a user.

* * * * *